Figure 3:
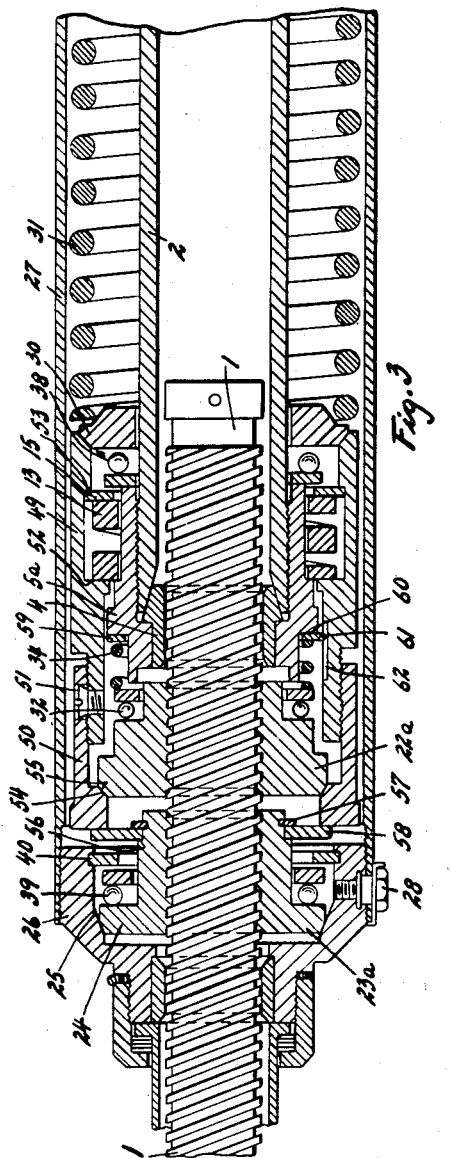

June 3, 1958  E. M. JEPPSSON  2,837,179
AUTOMATIC SLACK ADJUSTERS
Filed Sept. 14, 1955  2 Sheets-Sheet 1
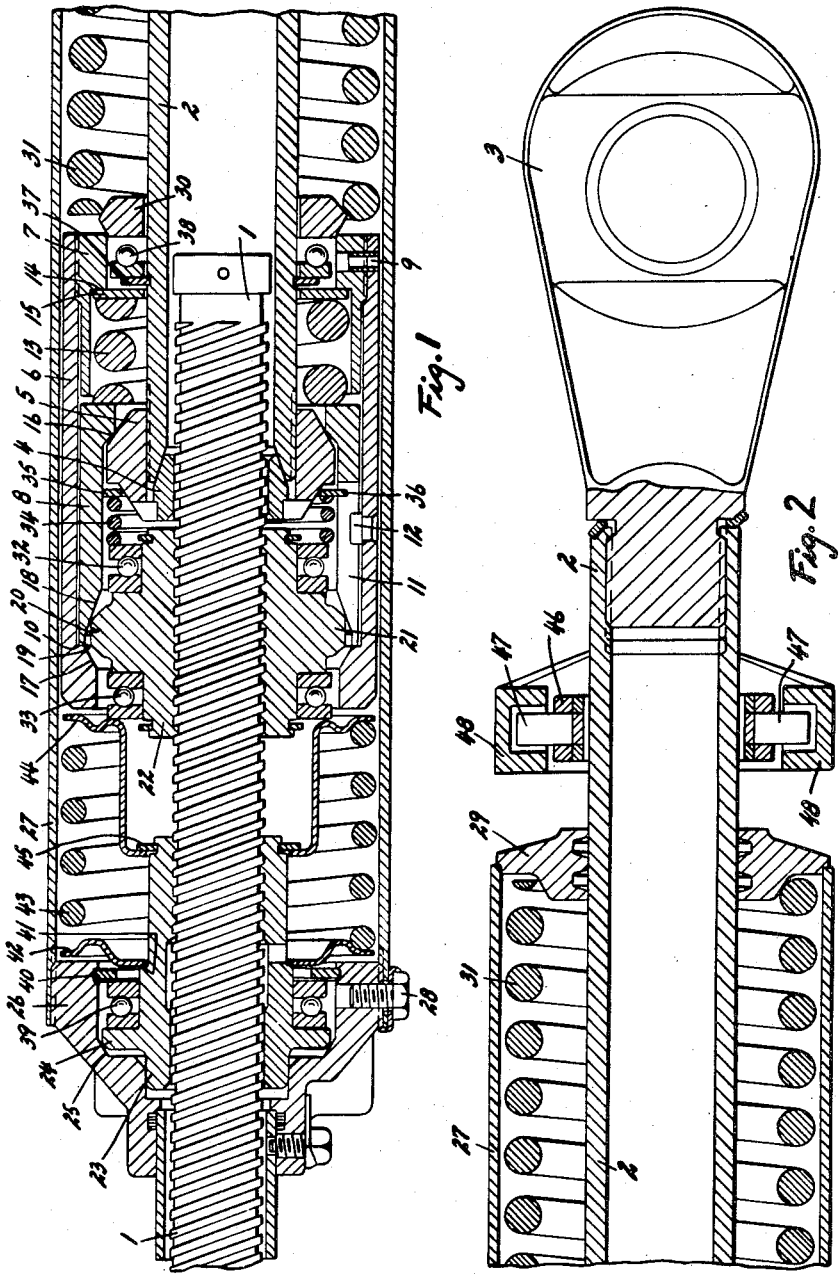
INVENTOR
ERIK M. JEPPSSON June 3, 1958  E. M. JEPPSSON  2,837,179
AUTOMATIC SLACK ADJUSTERS
Filed Sept. 14, 1955  2 Sheets-Sheet 2

INVENTOR
ERIK M. JEPPSSON

United States Patent Office 2,837,179
Patented June 3, 1958

2,837,179

AUTOMATIC SLACK ADJUSTERS

Erik Mauritz Jeppsson, Limhamn, Sweden, assignor to Svenska Aktiebolaget Bromsregulator, Malmo, Sweden, a corporation of Sweden Application September 14, 1955, Serial No. 534,350

Claims priority, application Germany September 27, 1954

10 Claims. (Cl. 188—196)

The present invention relates to automatic slack adjusters of the type comprising a two-part brake rod, the two parts of which are axially movable in relation to each other, one of said two parts being a tubular rod and the other part being a threaded spindle projecting into said tubular rod through one end thereof, a feed member and a coupling member threadedly engaged with said threaded spindle, an operating member axially movable and rotatable on said two-part brake rod, spring means axially urging said operating member in relation to said tubular rod toward the other end thereof, means for coupling said feed member to said operating member for rotation, a housing axially engaged with said tubular rod and having a seat for coaction with said coupling member for transmission of braking power between said two brake rod parts, and means for coupling said housing to said operating member for rotation.

In slack adjusters of this type it is sometimes desired, e. g. for the substitution of new brake shoes for worn ones, to have the possibility of operating the slack adjuster by hand so as to produce the necessary space for inserting the new shoes. For this purpose, certain previous designs of slack adjusters incorporated the feature that one of the two brake rod parts was made rotatable in relation to its jaw and normally held against rotation by means of a friction clutch or a releasable securing means, so that said brake rod part could, if necessary, be manually turned in relation to the other brake rod part and the desired adjustment carried out. Such a friction clutch or the like interposed between one brake rod part of the slack adjuster and its jaw results however in a relatively large increase of the manufacturing costs of the slack adjuster, and due to the exposed location of said clutch there is the risk that its reliable function will be disturbed by dirt, ice, mechanical shocks etc.

The invention therefore has for its object to provide an improved brake slack adjuster of the above type which is cheap in manufacture, of simple design and of an extraordinarily reliable function. This object is attained in slack adjusters of the type referred to by making said housing rotatable in relation to said tubular rod and by interposing a slip clutch between said housing and said tubular rod in order that said feed member and coupling member may be screwed along the threaded spindle by rotation of the operating member and the housing together in relation to the two brake rod parts. This arrangement can be designed in a particularly simple and inexpensive manner by making use of certain structural elements, which have to be used anyway in the slack adjuster, in a non-modified or somewhat modified form for the slip clutch to be interposed between the housing and said tubular rod.

Further and more specific objects of the invention will become apparent from the following description, reference being had to the accompanying drawings illustrating two preferred forms of the invention in which the slack adjuster parts are shown in their normal positions, that is to say the position they occupy when no external pull is exerted on the slack adjuster. In the drawings:

Fig. 1 is an axial section through one half of a double-acting slack adjuster, improved in accordance with the invention, Fig. 2 is an axial section through the other half of the slack adjuster in Fig. 1.

Fig. 3 similarly shows one part of a single-acting slack adjuster, whose other part may be identical with the adjuster part shown in Fig. 2.

Figure 4:
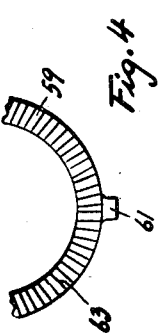

Fig. 4 shows part of a clutch ring, as seen from one end face.

The double-acting slack adjuster shown in Figs. 1 and 2 comprises a screw threaded spindle 1 of such a high lead as to be non-self-locking, and a tubular pull rod 2, which are coaxial and constitute the two parts of a two-part brake rod to be mounted in a brake rigging (not shown) particularly for railway vehicles. The parts 1 and 2 are non-rotatably secured in the brake rigging by means of jaws. The jaw of the tubular pull rod 2 is shown to the right in Fig. 2 at 3. The screw threaded spindle 1 and the tubular pull rod 2 are arranged in such a way as to be displaced axially in relation to each other when the slack adjuster is operating, the end of the screw threaded spindle moving in one or the other direction in the tubular pull rod 2 and being guided in its movement by a guide sleeve 4 which is clamped in the end of the tubular pull rod remote from the jaw 3 by means of a double cone 5 screwed onto said end of the tubular rod and anchored thereto.

The cone 5 is surrounded by a housing composed of three sleeves 6, 7 and 8. The sleeve 7 is screwed into one end of the outer sleeve 6 and locked therein by means of a pin 9. The sleeve 8 forms a brake force transferring member which is movable in the sleeve 6 between a shoulder 10 thereon and the inner end of the sleeve 7. Said sleeve 8 is held against rotation in relation to the sleeves 6 and 7 by the sleeve 8 having an axial slot 11 in which a pin 12 of the sleeve 6 engages. A compressed short strong coiled spring 13 surrounding the tubular rod 2 and yielding but to such a high tension as may arise in the two-part brake rod 1, 2 on braking, normally, that is to say at released brakes, holds the sleeve 8 applied against the shoulder 10 of the sleeve 6. The spring 13 is interposed between one end of the sleeve 8 and a disk 15 bearing against an abutment 14 of the sleeve 7. At one end the sleeve 8 has an internal seat 16 which transmits the brake force and against which one conical mantle surface of the double cone 5 abuts to transmit pull from the pull rod 2 to the sleeve 8, from where the pull is transmitted to the sleeve 6 through spring 13 and sleeve 7 until the pull is sufficiently large to further compress spring 13, and then also by the resulting direct thrust between sleeves 8 and 7. At its end remote from the sleeve 7 the sleeve 6 has an internal seat surface 17 which faces a similar seat surface 18 of the sleeve 8. Obtuse-angled peripheral corners 19 and 20 of an outwardly directed flange 21 on a coupling nut 22 screwed on the screw threaded spindle 1 are adapted to be pressed against said seat surfaces 17 and 18, respectively, to hold the nut 22 against rotation in relation to the housing or arresting member formed by the sleeves 6, 7 and 8. The arrangement is such that only one of the corners 19, 20 of the nut 22 is always applied against the respective seat surface 17 or 18 under the action of forces referred to in the following.

On the screw threaded spindle 1 there is also screwed a feed nut 23 having a peripheral flange 24. Said flange 24 can be pressed against a seat surface 25 of a feed sleeve 26 to provide such a frictional engagement of the feed nut and the feed sleeve that the said parts are non-rotatably retained in relation to one another. One end of a tubular operating member 27 is screwed on the feed sleeve 26, and a screw 28 prevents the operating member 27 from rotating in relation to the feed sleeve. Together with the feed sleeve 26 and an end wall 29 which is welded to the other end of the tubular operating member 27 and through which the tubular pull rod 2 passes, the tubular operating member forms a tubular housing for the mechanism of the slack adjuster, in which tubular housing the housing formed of sleeves 6, 7, 8 is axially movable and rotatable. Interposed between the end wall 29 and a seat ring 30 freely displaceable on the tubular pull rod 2 is a compressed coiled spring 31 which bears against conical surfaces on the end wall 29 and the seat ring 30 in order to ensure a sufficient frictional engagement to hold said seat ring against rotation in relation to the tubular operating member 27. At released brakes the spring 31 furthermore holds a conical seat surface on the seat ring 30 in engagement with the sleeve 7 of the housing 6, 7, 8 for coupling the latter to the tubular operating member 27 for rotation. As a result, the spring 31 also holds the flange 24 of the feed nut 23 in non-rotatable engagement with the seat surface 25 of the feed sleeve 26, the force of spring 31 being transferred from one end thereof to the other through end wall 29, tubular operating member 27, feed sleeve 26, feed nut 23, screw threaded spindle 1, coupling nut 22, flange corner 20 (pressed against seat surface 18 by spring 31), sleeve 8, spring 13 (much stronger than spring 31), disk 15, sleeve 7 and seat ring 30.

The coupling nut 22 has two axial ball bearings 32 and 33 each of which is in bearing engagement with one side of the nut flange 21, and furthermore one end of a spring 34 is supported on the ball bearing 32. The spring 34 tends to move the coupling nut 22 into bearing engagement with the seat surface 17 of the sleeve 6, but at released brakes the considerably stronger spring 31 prevents the spring 34 from moving the coupling nut and holds said coupling nut, in the manner described above, in engagement with the seat surface 18 against the action of the spring 34. In lieu of being held applied in hitherto usual manner direct against the tubular pull rod 2 or a part fixedly secured thereto, the other end of the spring 34 is supported on a coupling ring 35 which is pressed by the spring 34 against the conical mantle surface of the double cone 5 facing the coupling nut 22. The other conical mantle surface of the double cone 5 will be held permanently applied against the brake force transferring seat 16 of the sleeve 8 by the spring 34. The coupling ring 35 has a radially outwardly directed lug 36 which projects into the axial slot 11 of the sleeve 8 to non-rotatably connect the coupling ring 35 with the housing 6, 7, 8 while allowing axial movements of the coupling ring in relation to said arresting member. The parts 5, 16, 34, 35 thus form a slip friction clutch which at released brakes, when the parts of the slack adjuster occupy the positions shown, permits manual rotation of the tubular operating member 27 together with the housing 6, 7, 8 in relation to the tubular pull rod 2 while overcoming the friction of the double cone 5 on one hand against the coupling ring 35 and on the other against the seat 16. The nuts 22 and 23 which at released brakes are non-rotatably connected with the housing 6, 7, 8 and the feed sleeve 26, respectively, in the manner described above, can thus be rotated together with the tubular operating member 27, and by their rotation on the screw threaded spindle 1 they will move said spindle farther into the tubular pull rod 2 or withdraw it therefrom, whereby the brake rod formed by the slack adjuster will be shortened or lengthened.

The slip clutch arranged between the housing 6, 7, 8 and the tubular pull rod 2 and which makes it possible to screw the nuts 22, 23 along the screw threaded spindle 1 by a rotation of the tubular operating member 27 need not necessarily be a friction clutch as described above but may be any slip clutch whatever, e. g. a form-locking clutch of the pawl and ratchet type, or such a form-locking clutch as the one which will be described hereinafter in connection with Figs. 3 and 4, and the only important requirement is that the torque necessary for causing the clutch to slip be sufficiently large for preventing unintentional rotation of the tubular operating member 27, but still within the limits of force possible to exert manually on said operating member for the purpose of making an intentional adjustment.

The slack adjuster shown in Figs. 1 and 2 has an annular abutment member 37 for an axial ball bearing 38, said abutment member being mounted in a groove in the tubular pull rod 2. The axial ball bearing 38 has at released brakes, i. e. in the shown position of the parts, a certain axial play between the abutment member 37 and the seat ring 30. However, when a brake tension is created in the tubular pull rod 2, i. e. when on application of the brakes the brake shoe clearances have been consumed, first the pull rod 2 and all parts arranged thereon are moved through a small distance to the right as seen in Fig. 1 against the force of the spring 31 until the seat 17 of the sleeve 6 abuts the flange corner 19 of the coupling nut 22. At a further increase of the brake tension the spring 13 yields and the pull rod 2 and the brake force transferring member 8 are moved to the right through a further small distance until the last-mentioned member is applied against the inner end of the sleeve 7. At this last-mentioned movement the abutment member 37 is moved a distance to the right with respect to the sleeve 7, the ball bearing 38 abutting the seat ring 30 and moving it away from the sleeve 7 against the action of the spring 31. As a result, the housing 6, 7, 8 an the tubular operating member 27 will no longer be held against rotation by the spring 31 pressing the seat ring 30 against the sleeve 7. Due to the double cone 5 bearing against the seat surface 16 with the entire brake tension when such a tension exists, the housing 6, 7, 8 will be prevented from rotating in relation to the pull rod 2, and thanks to the seat surface 17 bearing, likewise with the entire brake tension, against the flange corner 19 of the coupling nut 22, said last-mentioned nut will be prevented from rotating in relation to the housing and the screw threaded spindle 1, whereby the slack adjuster will be securely held against unintentional displacement under the action of the brake tension exerted thereon.

An axial ball bearing 39 is mounted on the feed nut 23 between the flange 24 thereof and an abutment ring 40 secured in the feed sleeve 26. When the flange 24 bears against the seat surface 25, the bearing 39 has a certain axial play between the flange 24 and the abutment ring 40. The feed nut 23 has an extension 41 against which bears a supporting disk 42 for one end of a buffer spring 43, whose other end bears against a supporting ring 44 having a flange and resting in the shown position of the parts on an abutment ring 45 on the feed nut 23, said supporting ring 44 being however axially movable along the nut 23 against the action of spring 43. At released brakes the supporting ring 44 bears against the ball bearing 33 of the coupling nut 22, and the pretension of the buffer spring 43 is larger than that of the spring 34. An abutment ring 46 with two radially directed pins 47 is readily slidably mounted on the tubular pull rod 2 outside the end wall 29 of the operating member 27. Engaging said pins 47 is a fork 48 which is to be rigidly connected to a control rod (not shown) interposed in the brake rigging in such a way that on braking the abutment ring 46 and the pull rod 2 will be displaced in relation to each other proportionally to the stroke of the brake piston.

With the exceptions appearing from the above description the slack adjuster is of the same construction and operates in the same way as certain prior art slack adjusters of the double acting type, e. g. as disclosed in U. S. Patent No. 2,767,811, to B. H. Browall and E. M. Jeppsson (U. S. application Ser. No. 259,864, filed December 4, 1951), and for the understanding of the invention it will therefore be unnecessary to describe the mode of operation of the slack adjuster more in detail than what has already been done.

The form of the invention shown in Figs. 3 and 4 is applied to a single-acting slack adjuster, i. e. to a slack adjuster which is capable only of automatically reducing the brake slack, whereas an increase of said slack must always be carried out by hand. Most parts of this slack adjuster are fully or substantially identical with corresponding parts of the slack adjuster shown in Figs. 1 and 2 and they therefore bear the same reference numerals as therein. Fig. 3 shows merely the left-hand end portion of the slack adjuster; the right-hand portion is identical with the slack adjuster portion shown in Fig. 2.

The slack adjuster shown in Figs. 3 and 4 comprises the same screw threaded spindle 1, tubular pull rod 2, guide sleeve 4, compressed coiled spring 13, abutment disk 15, feed sleeve 26, tubular operating member 27, seat ring 30, spring 31 and axial ball bearing 38 as does the slack adjuster shown in Figs. 1 and 2.

Instead of the double cone 5 in the form of Figs. 1 and 2 the slack adjuster shown in Figs. 3 and 4 includes a sleeve 5a screwed fast to the end of the tubular pull rod 2 and locked against rotation, said sleeve 5a retaining the guide sleeve 4 and forming with its one end an abutment for carrying the ball bearing 38 along. The housing consists of a sleeve 49 and a sleeve 50 which are screwed together and held against rotation in relation to each other by means of a screw 51. The spring 13 is interposed with its supporting disk 15 between two internal shoulders 52 and 53 on the sleeve 49. The sleeve 50 has a seat surface 54 for so engaging a bevelled peripheral corner 55 of a coupling nut 22a screwed on the screw threaded spindle 1 that a rotation of the sleeve 50 is prevented. Furthermore, a feed nut 23a having a flange 24 for cooperating with the seat surface 25 of the feed sleeve 26 is screwed on the screw threaded spindle 1 which is of such a lead as to be non-self-locking. Interposed with axial play between the flange 24 and an abutment ring 40 of the feed sleeve 26 is an axial ball bearing 39. The feed nut 23a also presents a shoulder 56 against which bears an abutment ring 58 secured to the feed nut 23a by means of a locking ring 57. At released brakes the sleeve 50 of the housing is in direct engagement with the abutment ring 58 so that the reaction of the spring 31 is transmitted as follows: from end wall 29 (Fig. 2) through operating member 27, feed sleeve 26, seat surface 25, flange 24 of feed nut 23a (which is non-rotatably pressed against said seat surface 25 by spring 31), shoulder 56, abutment ring 58, sleeve 50, sleeve 49 and seat ring 30 back to spring 31. Thus, at released brakes the spring 31 holds the operating member 27, the feed nut 23a and the housing 49, 50 non-rotatably connected together. Furthermore, the spring 34 holds the coupling nut 22a non-rotatably connected to the housing 49, 50 by one end of said spring bearing against the axial ball bearing 32 mounted on the coupling nut, whereby said spring presses the bevelled peripheral corner 55 of the coupling nut into such an engagement with the seat surface 54 of the housing that rotation between the coupling nut and the housing is prevented.

The other end of the spring 34 rests on a coupling ring 59 which is held applied by the spring against a radial coupling surface 60 on the sleeve 5a which is non-rotatably secured to the tubular pull rod 2. The coupling ring has a radially outwardly directed lug 61 which engages in an axial groove 62 provided in the sleeve 49 of the housing and which is axially movable therein so that the coupling ring is non-rotatably but axially movably coupled with the housing. The coupling ring 59 has radially elevated portions and notches 63 (Fig. 4) for engagement with corresponding elevated portions and notches provided in the coupling surface 60 of the sleeve 5a so that a form-locking slip clutch is formed between the housing 49, 50 and the tubular pull rod 2.

By manually exerting so large a torque on the operating member 27 that the mentioned slip clutch slips it is thus possible at released brakes, when the parts occupy the positions shown, to rotate the operating member 27, the nuts 22a and 23a which are non-rotatably connected to said operating member in the manner described above, and the housing 49, 50 in relation to the screw threaded spindle 1 and the tubluar pull rod 2, the said nuts being screwed along the screw threaded spindle 1 during their rotation and moving said spindle farther into said rod 2 or withdrawing it therefrom while increasing or reducing, respectively, the brake shoe clearances.

The further mode of operation of the slack adjuster shown in Figs. 3 and 4 need not be described herein because of it being identical with that of the prior art slack adjusters of the aforesaid U. S. Patent No. 2,767,811, to B. H. Browall and E. M. Jeppsson (U. S. application Ser. No. 259,864, filed December 4, 1951), to which reference is made in this connection.

What I claim and desire to secure by Letters Patent is:

1. An automatic brake slack adjuster comprising a two-part brake rod, the first part of said brake rod being a tubular rod part, the second part of said brake rod being a threaded spindle with one end within one end of said tubular rod part, said spindle being axially displaceable in said tubular rod part, a housing around said one end of said tubular rod part, said housing being rotatable relative to said tubular rod part, a coupling member housed in said housing and threadedly engaged with said spindle for transmitting braking stress between said tubular rod part and said spindle, a tubular operating member having a seat therein and being rotatably and axially displaceable on said tubular rod part and said spindle, spring means between said housing and said tubular operating member and axially urging said operating member toward the other end of said tubular rod part into a normal axial end position in relation thereto and holding said housing and said coupling member in frictional engagement, a feed member threadedly engaged with said spindle and housed in said tubular operating member and abutted by said seat in said normal axial end position of said operating member and movable on said spindle away from said tubular rod part when not abutted by said seat in said tubular operating member on axial displacement of the latter against the force of said spring means, means including a slip clutch frictionally connecting said housing to said tubular rod part and exerting a limited resistance to rotation between them, and said housing being frictionally coupled by the force of said spring means to said operating member for rotation together with said operating member in said normal axial end position thereof, whereby said housing and said coupling member therein are taken along in a rotation of said operating member on said brake rod due to slipping of said slip clutch and said spindle and said tubular rod part may be axially adjusted in relation to one another without rotating either of them in relation to the other.

2. An automatic brake slack adjuster as claimed in claim 1, and a ring rotatably and axially displaceable on said tubular rod part between said rotatable housing thereon and said spring means, said housing being axially movable in relation to said tubular rod part, further spring means clamped under axial compression in said housing for transmitting braking stress from said tubular rod part to said housing, a seat in said housing for coaction with said coupling member for transmitting braking stress from said housing to said spindle, and an anti-friction thrust bearing mounted on said tubular rod part for axially supporting said rotatable and axially displaceable ring on said tubular rod part on yielding of said further spring means to braking stress being transmitted thereby from said tubular brake rod to said housing.

3. An automatic brake slack adjuster as claimed in claim 2 in which said housing comprises a first sleeve rotatably mounted around said tubular rod part and an outer sleeve slidable within limits on said first sleeve and nonrotatably connected therewith and extending beyond both ends thereof and having an internal shoulder and with said seat for coaction with said coupling member for transmitting braking stress from said housing to said spindle, and an inner sleeve secured in the other end of said outer sleeve and formed with an internal shoulder, said further spring means being axially clamped between said first sleeve and said internal shoulder of said inner sleeve, and said first sleeve having a seat for coaction with said coupling member in one end adjacent said internal shoulder of said outer sleeve for coupling said coupling member to said first sleeve for rotation.

4. An automatic brake slack adjuster as claimed in claim 3, and said tubular rod having an external collar forming a shoulder, and said first sleeve being fitted over said collar and having an internal shoulder for coaction with said shoulder on said collar for transmitting braking stress from said tubular rod part to said first sleeve, said means including said slip clutch being mounted between said shoulder and said coupling member and urging said internal shoulder on said first sleeve into engagement with said collar.

5. An automatic brake slack adjuster as claimed in claim 4, and said slip clutch comprising a friction ring disposed within and non-rotatably and axially movable in relation to said first sleeve for coaction with said external collar on said tubular rod part, and spring means disposed between said coupling member and said friction ring and urging said friction ring against said collar and said coupling member toward said seat therefor in said outer sleeve.

6. An automatic brake slack adjuster as claimed in claim 5, and an antifriction thrust bearing between said slip clutch spring means and said coupling member.

7. An automatic brake slack adjuster as claimed in claim 6, and said collar having a conical surface for coaction with the inner periphery of said friction ring.

8. An automatic brake slack adjuster comprising a two-part brake rod, the first part of said brake rod being a tubular rod part, the second part of said brake rod being a threaded spindle with one end within one end of said tubular rod part, said spindle being axially displaceable in said tubular rod part, a housing around said one end of said tubular rod part, a coupling member housed in said housing and threadedly engaged with said spindle for transmitting braking stress between said tubular rod part and said spindle, a tubular operating member rotatably and axially displaceable on said tubular rod part, spring means between said housing and said operating member and urging said operating member toward the other end of said tubular rod part into a normal axial end position in relation thereto and holding said housing and said coupling member in frictional engagement, a feed member threadedly engaged with said spindle and housed in said tubular operating member and abutted thereby in said normal axial end position of said tubular operating member and movable on said spindle away from said tubular rod part by said operating member on axial displacement of said tubular operating member against the force of said spring means, said feed member taking up the force of said spring means and abutting said housing, said spring being of a strength to exert a frictional resistance to rotation between said housing and said operating member in said normal axial end position of said operating member on said tubular rod part, means including a slip clutch frictionally connecting said housing and said tubular rod part and exerting a limited resistance to rotation between them, and said limited resistance to rotation between said housing and said tubular rod part being less than the frictional resistance to rotation between said housing and said operating member in said normal axial end position of said operating member on said tubular rod part, whereby said housing and said coupling member are carried along in rotation of said operating member on said tubular rod part due to slipping of said slip clutch.

9. An automatic brake slack adjuster comprising a two-part brake rod, the first part of said brake rod being a tubular rod part, the second part of said brake rod being a threaded spindle with one end within one end of said tubular rod part, said spindle being axially displaceable in said tubular rod part, a housing around said one end of said tubular rod part, a coupling member housed in said housing and threadedly engaged with said spindle for transmitting braking stress between said tubular rod part and said spindle, a tubular operating member rotatably and axially displaceable on said tubular rod part, spring means between said housing and said operating member and urging said operating member toward the other end of said tubular rod part into a normal axial end position in relation thereto and holding said housing and said coupling member in frictional engagement, a feed member threadedly engaged with said spindle and housed in said tubular operating member and abutted thereby in said normal axial end position of said tubular operating member and movable on said spindle away from said tubular rod part by said operating member on axial displacement of said tubular operating member against the force of said spring means, said feed member taking up the force of said spring means and abutting said coupling member, said spring being of a strength to exert a frictional resistance to rotation between said housing and said operating member in said normal axial end position of said operating member on said tubular rod part, means including a slip clutch frictionally connecting said housing to said tubular rod part and exerting a limited resistance to rotation between them, and said limited resistance to rotation between said housing and said tubular rod part being less than the frictional resistance to rotation between said housing and said operating member in said normal axial end position of said operating member on said tubular rod part, whereby said housing and said coupling member are carried along in rotation of said operating member on said tubular rod part due to slipping of said slip clutch.

10. An automatic brake slack adjuster as claimed in claim 9, in which said slip clutch comprises a clutch ring around said tubular rod part in said rotatable housing thereon, said clutch ring being rotatable in relation to said tubular rod part and engaged with said housing to be nonrotatable in relation thereto, an exteral shoulder provided on said tubular rod part within said rotatable housing thereon and engaged by said clutch ring, a spring between said coupling member in said housing and said clutch ring urging said clutch ring against said shoulder, said spring being weaker than said spring means, and an antifriction thrust bearing between said coupling member and said spring.

References Cited in the file of this patent

UNITED STATES PATENTS 2,767,811     Browall et al. _____ Oct. 23, 1956